US007877802B2

(12) United States Patent
Marinescu

(10) Patent No.: US 7,877,802 B2
(45) Date of Patent: *Jan. 25, 2011

(54) SYSTEM AND METHOD FOR PROACTIVE COMPUTER VIRUS PROTECTION

(75) Inventor: Adrian M. Marinescu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 500 days.

This patent is subject to a terminal disclaimer.

(21) Appl. No.: 12/019,479

(22) Filed: Jan. 24, 2008

(65) Prior Publication Data

US 2008/0141286 A1 Jun. 12, 2008

Related U.S. Application Data

(63) Continuation of application No. 10/783,275, filed on Feb. 20, 2004, now Pat. No. 7,376,970.

(51) Int. Cl.
G06F 11/00 (2006.01)
(52) U.S. Cl. .................... 726/22; 726/23; 726/24
(58) Field of Classification Search ............ 726/22–26; 713/187–188
See application file for complete search history.

(56) References Cited

U.S. PATENT DOCUMENTS 5,978,917 A * 11/1999 Chi .............................. 726/22

7,146,305 B2 12/2006 van der Made
7,228,434 B2 6/2007 Zisowski

OTHER PUBLICATIONS

Deeb, K., and S. Lewis, "A Biological Approach to the Development of Computer Autoimmune Systems," Proceedings of 13th Int'l Symposium: Foundations of Intelligent Systems (ISMIS 2002), Lyon, France, Jun. 27-29, 2002, in M.-S. Hacid et al. (eds.), "Lecture Notes in Computer Science" 2366:514-525, 2002.
Hilley, S. (ed.), "Hackers Hit and Run," Computer Fraud & Security, Nov. 2003, pp. 1-2.
Karresand, M., "Separating Trojan Horses, Viruses, and Worms—A Proposed Taxonomy of Software Weapons," Proceedings of the 2003 IEEE Workshop on Information Assurance, United States Military Academy, West Point, N.Y., Jun. 2003, pp. 127-134.
Natvig, K., "Sandbox Technology Inside AV Scanners," Proceedings of the Eleventh Virus Bulletin Int'l Conf. and Exhibition, Prague, Sep. 27-28, 2001, pp. 475-488.

(Continued)

Primary Examiner—Hosuk Song
(74) Attorney, Agent, or Firm—Wolf, Greenfield & Sacks, P.C.

(57) ABSTRACT

A system, method, and computer readable medium for the proactive detection of malware in operating systems that receive application programming interface (API) calls is provided. A virtual operating environment for simulating the execution of programs and determining if the programs are malware is created. The virtual operating environment confines potential malware so that the systems of the host operating environment will not be adversely effected. During simulation, a behavior signature is generated based on the API calls issued by potential malware. The behavior signature is suitable for analysis to determine whether the simulated executable is malware.

19 Claims, 8 Drawing Sheets

OTHER PUBLICATIONS

Shinagawa, T., et al., "Flexible and Efficient Sandboxing Based on Fine-Grained Protection Domains," Proceedings of Mext-NSF-JSPS Int'l Symposium: Software Security—Theories and Systems (ISSS 2002), Tokyo, Nov. 8-10, 2002, in M. Okada et al. (eds.), "Lecture Notes in Computer Science" 2609:172-184, 2002.

Weber, M., et al., "A Toolkit for Detecting and Analyzing Malicious Software," Proceedings of the 18th Annual Computer Security Applications Conference (ACSAC'02), Las Vegas, Nevada, Dec. 9-13, 2002, pp. 423-431.

Xie, B.Q., "The Effect of Infection Behaviors of Computer Virus on Early Detection and Detection Systems Deployment Strategies," Proceedings of the Int'l Conf. on Telecommunications (ICT 2002), Beijing, Jun. 23-26, 2002, vol. 1, pp. 108-118.

* cited by examiner

SYSTEM AND METHOD FOR PROACTIVE COMPUTER VIRUS PROTECTION

CROSS-REFERENCE TO RELATED APPLICATION

This application is a continuation of U.S. Application No. 10/783,275, filed Feb. 20, 2004.

BACKGROUND

The present invention relates to computing devices and more particularly to virus protection of computing devices.

As more and more computing devices such as personal computers, personal digital assistants, cellular telephones, etc., are interconnected through various networks, such as the Internet, computing device security has become increasingly more important. In particular, security against computing device external attacks from malware has become increasingly more important. Malware, for purposes of the present discussion, is defined as a software source of an unwanted computer attack. As such, those skilled in the art will appreciate that malware includes, but is not limited to, computer viruses, Trojan horses, worms, denial of service attacks, abuse/misuse of legitimate computer system functions, and the like. The primary defense against malware is anti-virus software.

Anti-virus software scans computing device data looking for malware. The computing device data may be incoming data, or data stored in the computing device, or a hard drive, for example. Previously developed anti-virus software scans the data for identifiable patterns associated with known malware. Thus, unfortunately, current anti-virus software identifies only known malware. New, unknown malware is not detected by current anti-virus software. Consequently, current anti-virus software is considered to be reactionary, operating on malware after it has been released and identified.

The typical manner in which current anti-virus software operates to protect computing devices from new malware is as follows. First, unknown malware is usually released via network messages, infecting unprotected computing devices. Infected computing devices include computers that have anti-virus software, but not up-to-date anti-virus software because the malware is unknown. Upon detecting that unknown malware has been released, an anti-virus software provider examines/analyzes the unknown malware in order to identify at least one recognizable pattern by which the malware can be detected in transit. Once a pattern is identified, the anti-virus software provider creates and publishes an update for its anti-virus software. This update uses the identified pattern to enable anti-virus software installations to recognize the now-identified malware as it arrives. However, this update only protects a computing device after the computing device has received and installed the updated anti-virus software. Unfortunately, the period of time that it takes to update a particular computing device may range anywhere from a matter of minutes to several days, depending on individual circumstances.

As already mentioned, the current anti-virus software protection paradigm is a reactionary system; i.e., the anti-virus software is updated to protect a computer from malware only after the malware is released. Unfortunately, this means that at least some computers will be infected before anti-virus software is updated. Furthermore, the anti-virus update cycle is an extremely costly process for anti-virus providers, and ultimately for the consumers that purchase anti-virus software.

A substantial portion if not almost all unknown malware that exploits computer vulnerabilities are rewrites of previously released malware. Indeed, encountering absolutely novel malware is relatively rare. However, due to the pattern matching system employed by current anti-virus systems, it is not difficult to rehash/rewrite known malware such that the malware will get past the protection provided by anti-virus software. For example, malware code is readily accessible, and it is a simple task to change variable names, reorder lines of code, or slightly modify the behavior of the malware such that the rewritten malware will not be recognized by anti-virus software. In order to provide an update, anti-virus software providers must locate an identifying pattern in the rewritten malware and create an update for the anti-virus software even though the malware has previously been dealt with.

Certain malware specifically targets operating systems that make Application Programming Interface (API) calls, such as the Microsoft™ 32-bit operating systems (hereinafter "Win 32 operating systems"). APIs form a layer of software that defines a set of services offered by an operating system to an executable. An executable written for Win 32 APIs, for example, will run on all Win 32 operating systems. These systems are often targets of malware designers because their popularity offers a better opportunity for widespread dissemination of malware. For example, macro viruses specifically target Win 32 operating systems by embedding themselves in files created with applications that support macro languages. Applications that support macro languages available to run on the Win 32 operating systems include Microsoft Word™ and Microsoft Excel™.

In light of the above-identified problems, it would be beneficial to computer users, both in terms of computer security and in terms of cost-effectiveness, to have anti-virus software that proactively protects a computer against rewritten, or reorganized, malware designed for operating systems that make API calls. The present invention is directed to providing such software.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with this invention, a system, method, and computer-readable medium for simulating the execution of potentially malicious software (hereinafter "malware") in an operating system that receives API calls such as the Microsoft™ 32-bit operating systems (hereinafter "Win 32 operating systems") is provided. In accordance with the invention, a virtual operating environment for simulating the execution of programs to determine if the programs are malware is created. The virtual operating environment confines potential malware so that the systems of the host operating environment will not be adversely effected during simulation. As a program is being simulated, a set of behavior signatures is generated. The collected behavior signatures are suitable for analysis to determine if the program is malware.

In accordance with one aspect of the present invention, a method that simulates a sequence of API calls made in an executable is provided. Potential malware (i.e., an executable) is received, and "interesting" API calls are parsed from the executable's machine code. These "interesting" API calls are those that have been previously identified as potentially indicative of malware. Then the parsed API calls are "executed" in the virtual operating environment of the present invention using stub Dynamically Linked Libraries (hereinafter "stub DLLs"). During "execution," the stub DLLs generate a behavior signature for each of the API calls that is stored for analysis by virus scanning software.

In accordance with another aspect of the present invention, a virtual operating environment that simulates the components of an operating system that receives API calls is provided. Components of the virtual operating environment include an interface, a virtual processing unit, API handling routines, an Input/Output emulator, a loader, a stack data structure, and a memory management unit that manages a virtual address space. These components perform operations similar to a real operating system that receives API calls including but not limited to: (1) generating events so that stub DLLs may be loaded into memory: (2) employing a memory management unit to map physical locations in memory to a virtual address space: and (3) allowing potential malware to generate Input/Output (hereinafter "I/O") when making API calls. The present invention generates computer-executable instructions that are only capable of being filtered by the provided virtual operating environment.

In accordance with other aspects of the present invention, a plurality of stub DLLs that mirror a set of full operating system DLLs is provided. DLLs provided by an operating system are collections of compiled machine code (i.e., executables) composed of API handling routines that perform behaviors requested by a calling executable. The stub DLLs have the same interface as the fully implemented DLLs that they mirror. However, the stub DLLs "execute" API calls only using components of a virtual operating environment and do not directly access the host operating environment. Put differently, the stub DLLs are designed to operate with the minimalist components available in the virtual operating environment. These components of the virtual operating environment and the stub DLLs that are "executed" in that environment are optimized with the minimal set of instructions needed to simulate potential malware.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

The present invention is generally directed to a system and method for the proactive detection of malware in computing devices that include an operating system that makes Application Programming Interface ("API") calls. More specifically, the present invention provides a system and method for simulating a program that may be malware in a virtual operating environment. During such simulation, a behavior signature is generated based on the API calls issued by potential malware. The behavior signature is suitable for analysis to determine whether the simulated executable is malware.

Although the present invention will be described in the context of a particular operating system, namely the Win 32 operating systems, those skilled in the relevant art and others will appreciate that the present invention is also applicable to other operating systems that make API calls. Accordingly, the described embodiments of the present invention should be construed as illustrative in nature and not as limiting.

Figure 1:
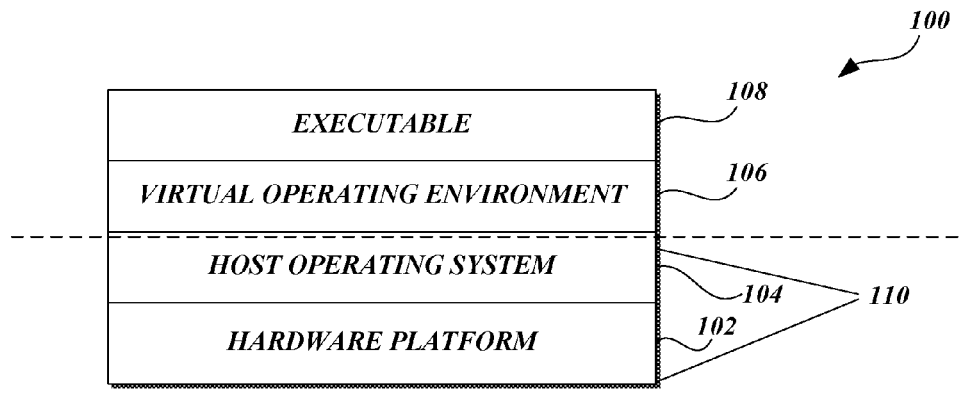
FIG. 1 is a block diagram illustrating the hierarchical structure of a computer suitable for embodying the present invention.

FIG. 1 is a block diagram of computing device 100 configured to embody the present invention. The computing device 100 may be any one of a variety of devices including, but not limited to, personal computing devices, server-based computing devices, personal digital assistants, cellular telephones, other electronic devices having some type of memory, and the like. For ease of illustration and because they are not important for an understanding of the present invention, FIG. 1 does not show the typical components of many computing device 100, such as a keyboard, a mouse, a printer or other I/O devices, a display, etc.

The computing device 100 illustrated in FIG. 1 includes a hardware platform 102, a host operating system 104, a virtual operating environment 106, and an executable 108 (i.e., a program) representative of potential malware. As signified by the dashed line, hardware platform 102 and host operating system 104 collectively form a host operating environment 110. For ease of illustration and because they are not important to an understanding of the present invention, FIG. 1 does not show the components of hardware platform 102 such as a central processing unit, memory, hard drive, etc. Also, for similar reasons, FIG. 1 does not show any components of host operating system 104, the virtual operating environment 106, or executable 108.

As shown in FIG. 1, the components of computing device 100 are layered with the hardware platform 102 on the bottom layer and executable 108 on the top layer. The layering of FIG. 1 illustrates that, preferably, the present invention is embodied in a hierarchical environment. Each layer of computing device 100 is dependent on systems in lower layers. More specifically, executable 108 runs on top of virtual operating environment 106, which forms part of the present invention, and is not able to directly access components of the host operating environment 110.

Figure 2:
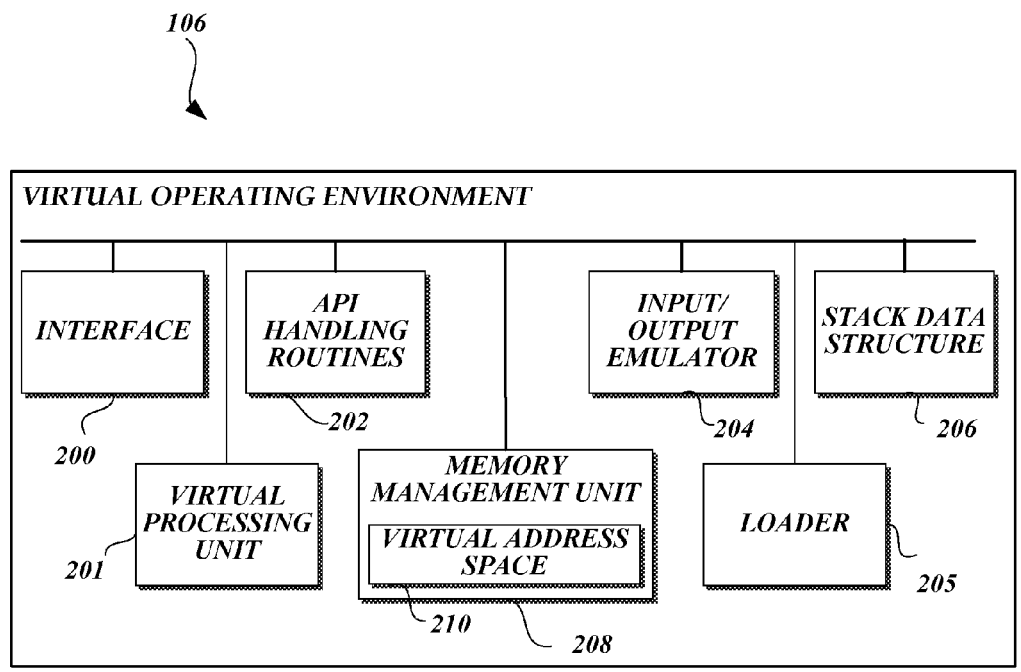
FIG. 2 is a block diagram illustrating the components contained in the virtual operating environment of FIG. 1.

As will be better understood from the following description, embodiments of the present invention provide a set of software-implemented resources in the virtual operating environment 106 for use in executing selected executables of potential malware, herein sometimes referred to as simulating potential malware. As illustrated in FIG. 2, components of the virtual operating environment 106 include an interface 200, virtual processing unit 201, API handling routines 202, an Input/Output emulator 204, a loader 205, a stack data structure 206, and a memory management unit 208 that manages a virtual address space 210. As also illustrated in FIG. 2, the components of virtual operating environment 106 are interconnected and able to communicate with other components using software engineering techniques generally known in the art. Component functions and the methods of simulating potential malware in virtual operating environment 106 will be described in detail with reference to FIGS. 7A-B and 8.

Figure 3:
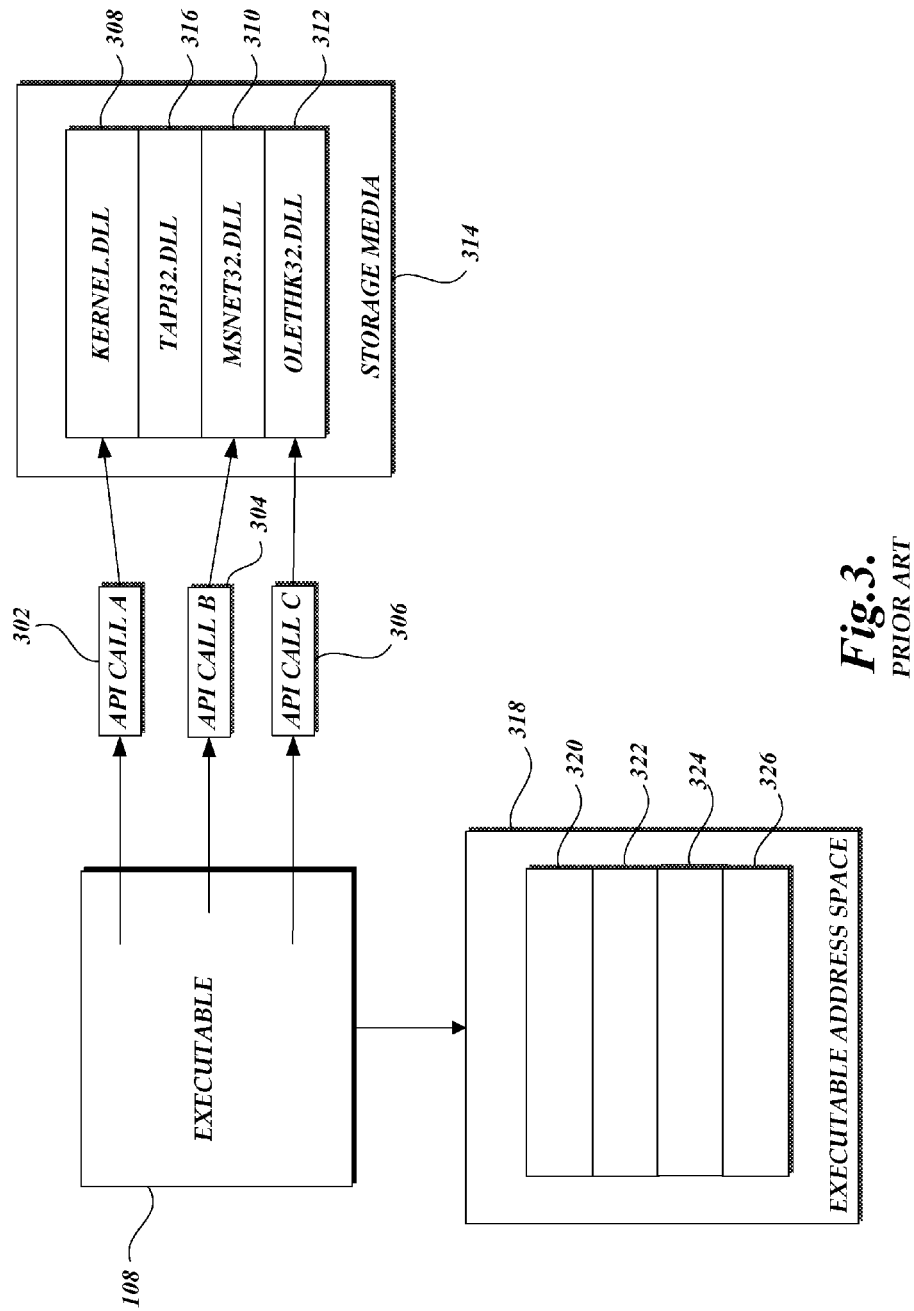
FIG. 3 is a block diagram illustrating the process of associating Dynamically Linked Libraries with API calls in accordance with the prior art.
Figure 4:
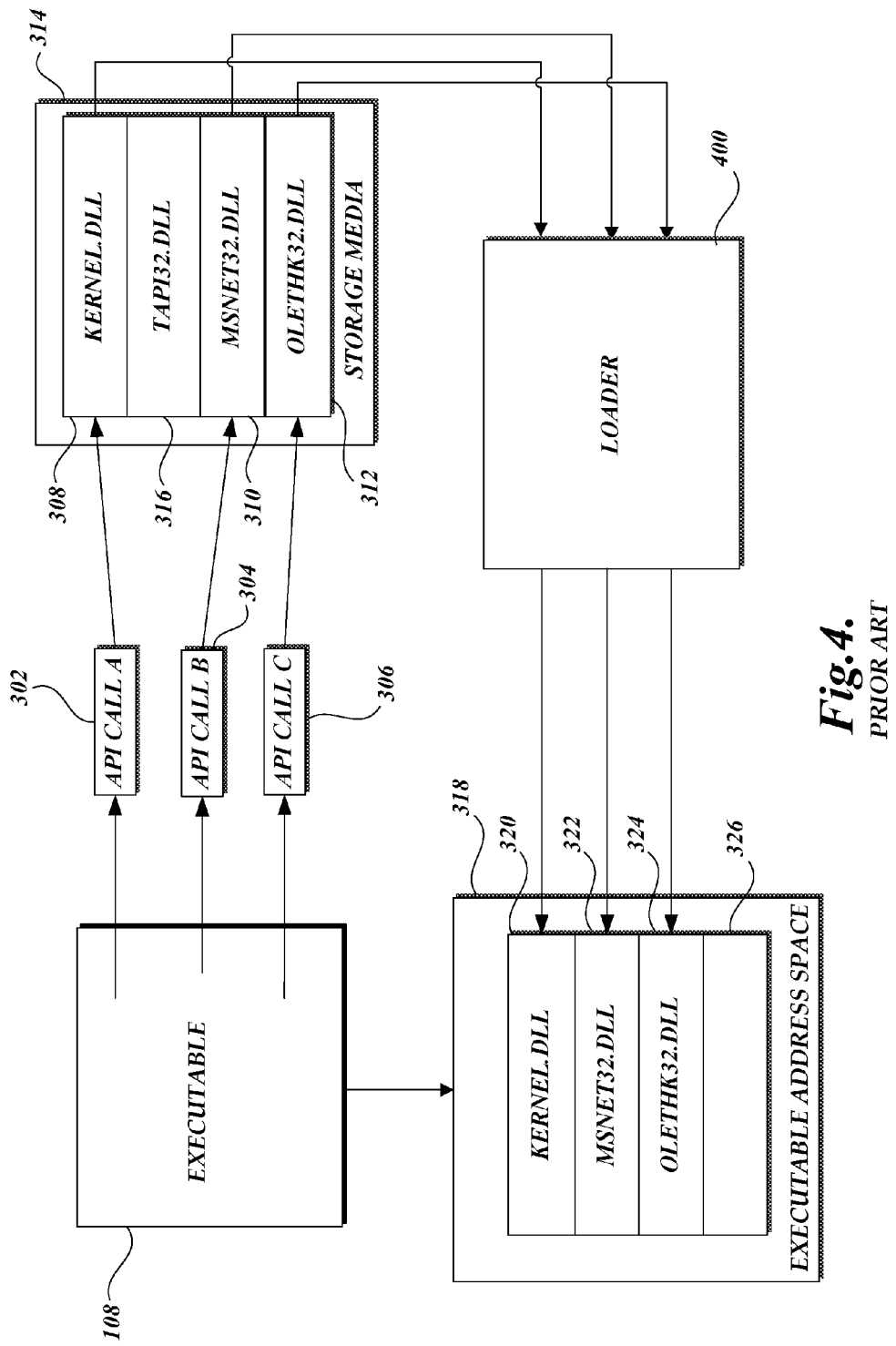
FIG. 4 is a block diagram illustrating the process of loading Dynamically Linked Libraries into an executable's address space in accordance with the prior art.

FIGS. 3 and 4 illustrate the prior art process of linking DLLs to a calling executable in an operating system that makes API calls. Typically, executable programs are constructed by combining segments of source code obtained from different sources. The segments may be combined before compiling and then compiled into an executable program. Alternatively, when a segment of source code is frequently used, it is often preferable to compile the segment separately and produce a module, and to combine the module with other modules when that functionality of the module is actually needed. The combining of modules after compilation is called linking. When the decision regarding which modules to combine depends on run time conditions, and the combination of modules occurs at run time, i.e., just before execution, the linking is called dynamic linking.

In some operating systems, such as the Win 32 operating system, compiled code that handle API calls are linked to the calling executable by DLLs. If an API call is made, the corresponding DLL is loaded from a storage device (i.e., a hard drive) into either an address space used solely by the calling executable or a shared address space. The address space available to an executable is the actual memory store used when the executable is running. The address space may be mapped to a volatile memory location (i.e., a random access memory location) or a storage device location (i.e., a virtual memory location) or a combination of both. Typically, an operating system initializes the executable's address space just prior to execution. Then the operating system's loader copies required data from a storage media into the initialized address space.

In FIG. 3, executable 108 contains three API calls: API CALL A 302, API CALL B 304, and API CALL C 306. API CALL A 302 requires executable code in a DLL identified as KERNEL.DLL 308 that must be linked to executable 108 for API CALL A 302 to be satisfied. Similarly, API CALLS B 304 and C 306 reference executable code identified as MSNET32.DLL 310 and OLETHK32.DLL 312, respectively. Both MSNET32.DLL 310 and OLETHK32.DLL 312 must be linked to executable 108 for API CALLS B 304 and C 306 to be satisfied. KERNEL.DLL 308, MSNET32.DLL 310, and OLETHK32.DLL 312 are stored on a storage media 314 along with other DLLs, such as TAPI32.DLL 316 which does not satisfy any API calls. When executable 108 is selected for execution and an event is generated, the operating system initializes an executable's address space 318 and assigns the address space to a series of memory locations, four of which, 320, 322, 324, and 326, are shown in FIG. 3. An event is defined as a mechanism that transfers control of the hardware platform to the operating system so that the operating system may provide a service i.e. initializing an executable's address space.

FIG. 4 illustrates the process in the operating systems of loading DLLs into an executable's address space. As described with reference to FIG. 3, API CALL A 302, API CALL B 304, and API CALL C 306 require KERNEL.DLL 308, MSNET32.DLL 310, and OLETHK32.DLL 312 for execution. Prior to execution, a loader 400 copies the KERNEL.DLL 308, MSNET32.DLL 310, and OLETHK32.DLL 312 from the storage media 314 to the three memory locations 320, 322, and 324 of the executable address space 318. This transfer allows the KERNEL.DLL 308, MSNET32.DLL 310, and OLETHK32.DLL 312 to be linked to the executable 108. Thus, API CALL A 302, API CALL B 304, and API CALL C 306 are capable of being satisfied.

Figure 5:
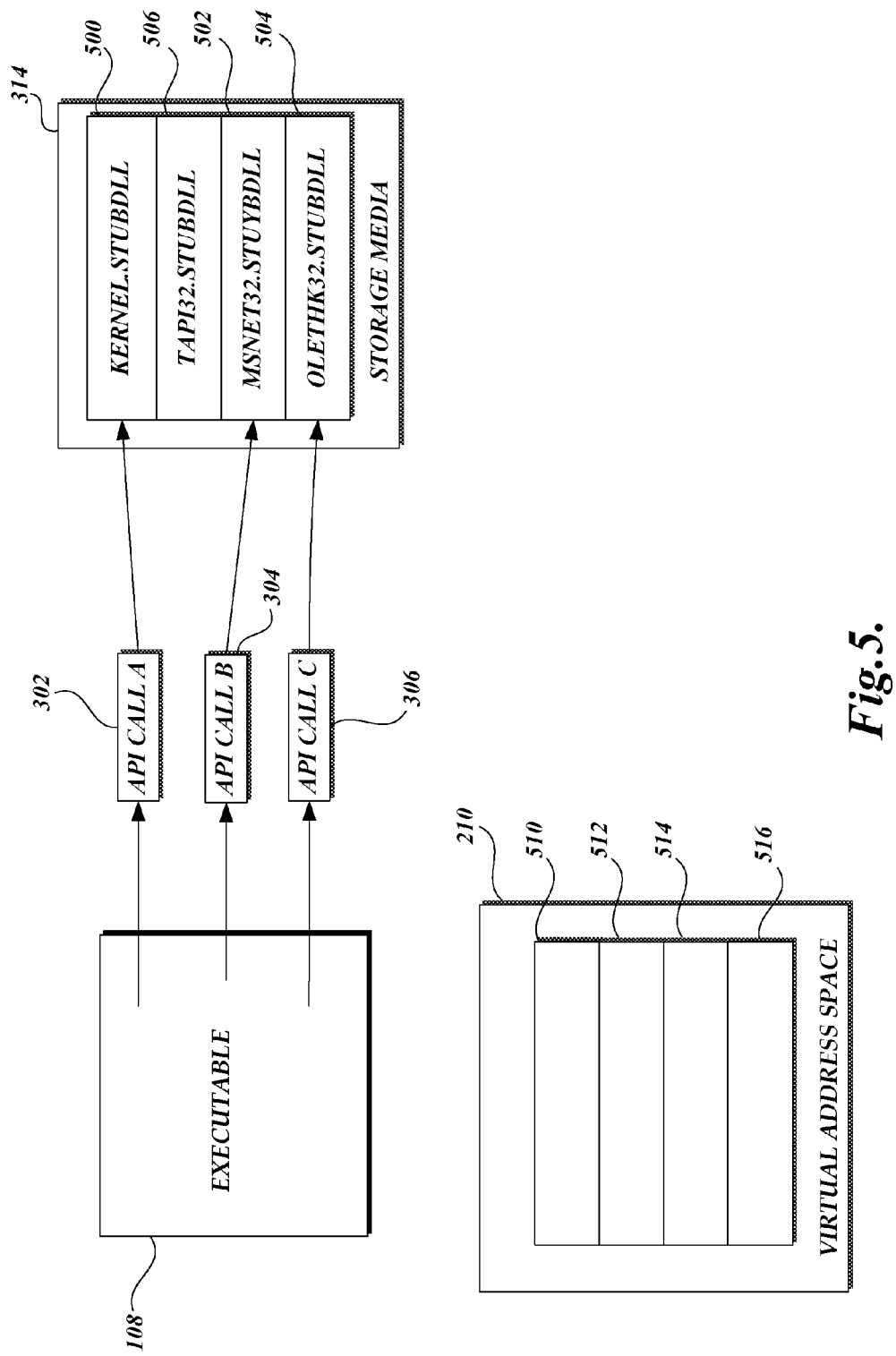
FIG. 5 is a block diagram illustrating the process of associating stub Dynamically Linked Libraries with API calls in accordance with the present invention.
Figure 6:
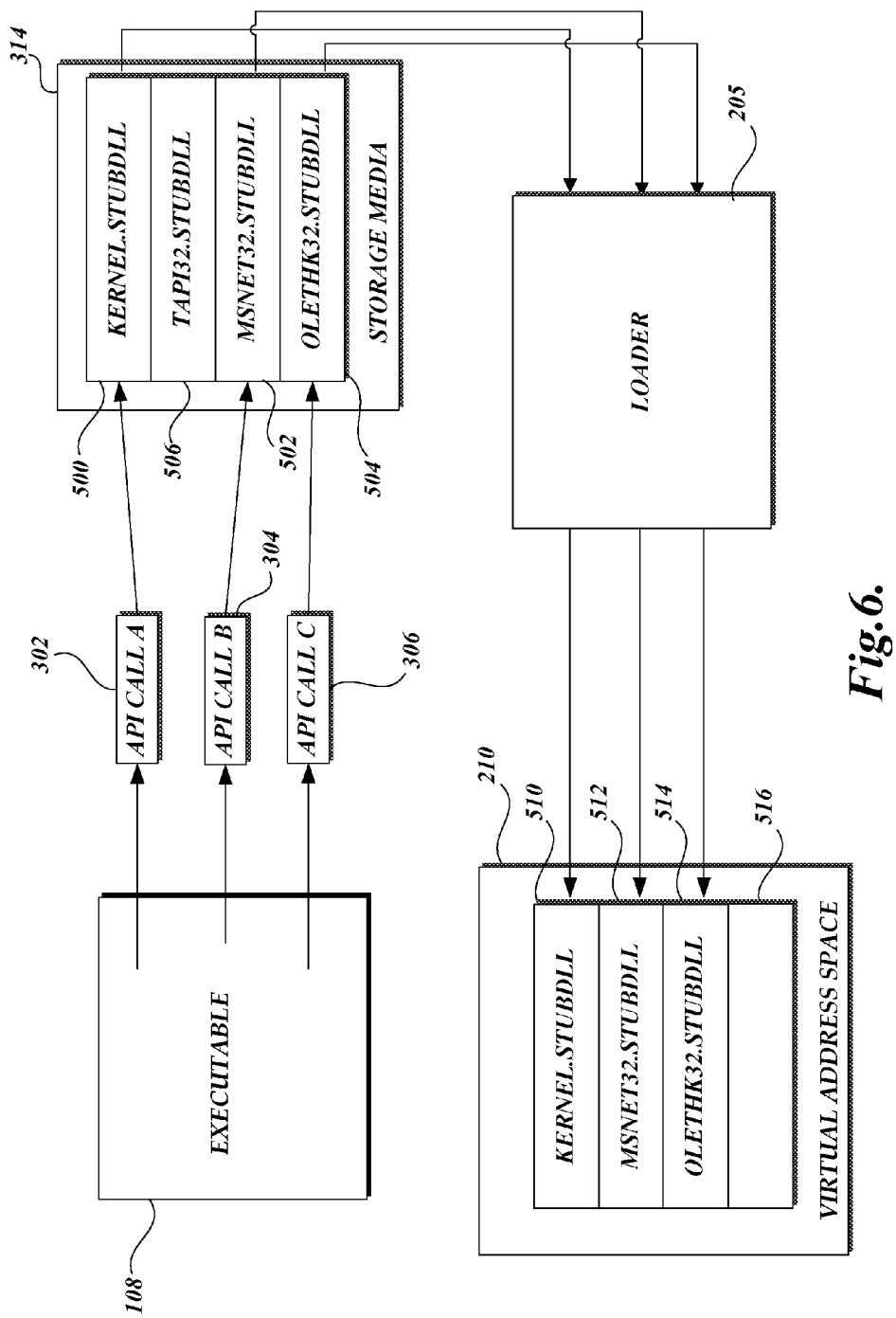
FIG. 6 is a block diagram illustrating the process of loading stub Dynamically Linked Libraries into a virtual address space in accordance with the present invention.

FIGS. 5 and 6 illustrate the process of dynamically linking DLLs in a virtual operating environment 106 in accordance with this invention. As described above with reference to FIGS. 3 and 4, the operating system copies necessary DLLs into an executable's address space. Then the copied DLLs are linked to the calling executable when required during program execution. The present invention also uses DLLs to "execute" a sequence of API calls. However, instead of fully implemented DLLs, the present invention uses a set of stub DLLs, which are copied into the address space of the virtual operating environment 106. An advantage of this approach is very low memory requirements of the virtual operating environment 106 in which the potential malware is "executed."

In FIG. 5, the executable 108 shown in FIGS. 3 and 4 is selected for execution in the virtual operating environment 106. As described above with reference to FIGS. 3 and 4, the executable 108 contains API CALL A 302, API CALL B 304, and API CALL C 306. In the virtual operating environment 106, API CALL A 302 is satisfied by executable code in a stub DLL identified as KERNEL.STUBDLL 500. Similarly, API CALL B 304, and API CALL C 306 are satisfied by stub DLLs identified as executable code in MSNET32.STUBDLL 502 and OLETHK32.STUBDLL 504, respectively. All of the stub DLLs need to be linked to the executable 108. The stub DLLs, i.e., the KERNEL.STUBDLL 500, MSNET32.STUBDLL 502, and OLETHK32.STUBDLL 504 are stored in the storage media along with other stub DLLs like TAPI32.STUBDLL 506. When executable 108 is selected for execution an event is generated, the virtual operating environment 106 initializes the virtual address space 210 and assigns a suitable number of memory locations, four of which, 510, 512, 514, and 516 are shown in FIGS. 5 and 6.

FIG. 6 illustrates the process of loading stub DLLs into the virtual address space 210. As described above with reference to FIG. 5, API CALL A 302, API CALL B 304, and API CALL C 306 are handled by executable code in the KERNEL.STUBDLL 500, MSNET32.STUBDLL 502, and OLETHK32.STUBDLL 504, respectively. Prior to execution of executable 108, KERNEL.STUBDLL 500, MSNET32.STUBDLL 502, and OLETHK32.STUBDLL 504 are copied by the loader 205 from the storage media 314 into the virtual address space 210. As a result, the executable code contained in these stub DLLs is available in the virtual operating environment 106. Thus, API CALL A 302, API CALL B 304, and API CALL C 306 are available for execution using the KERNEL.STUBDLL 500, MSNET32.STUBDLL 502, and OLETHK32.STUBDLL 504.

Stub DLLs are collections of executable code that have the same interface as fully implemented DLLs but only simulate API calls using components of the virtual operating environment 106. In many operating systems, such as the Win 32 operating system, fully implemented DLLs may issue millions of instructions to a central processing unit when handling individual API calls. Conversely, the stub DLLs employed in embodiments of the present invention are highly abbreviated when compared to the DLLs that they mirror. As a result, simulating a set of API calls in accordance with the present invention is faster than executing the same API calls with fully implemented DLLs. Also, the virtual operating environment 106 of the present invention does not simulate all API calls supported in the related operating systems. API calls that are not indicative of malware and, as a result, are not considered "interesting" by the present invention, are not simulated.

Figure 7A:
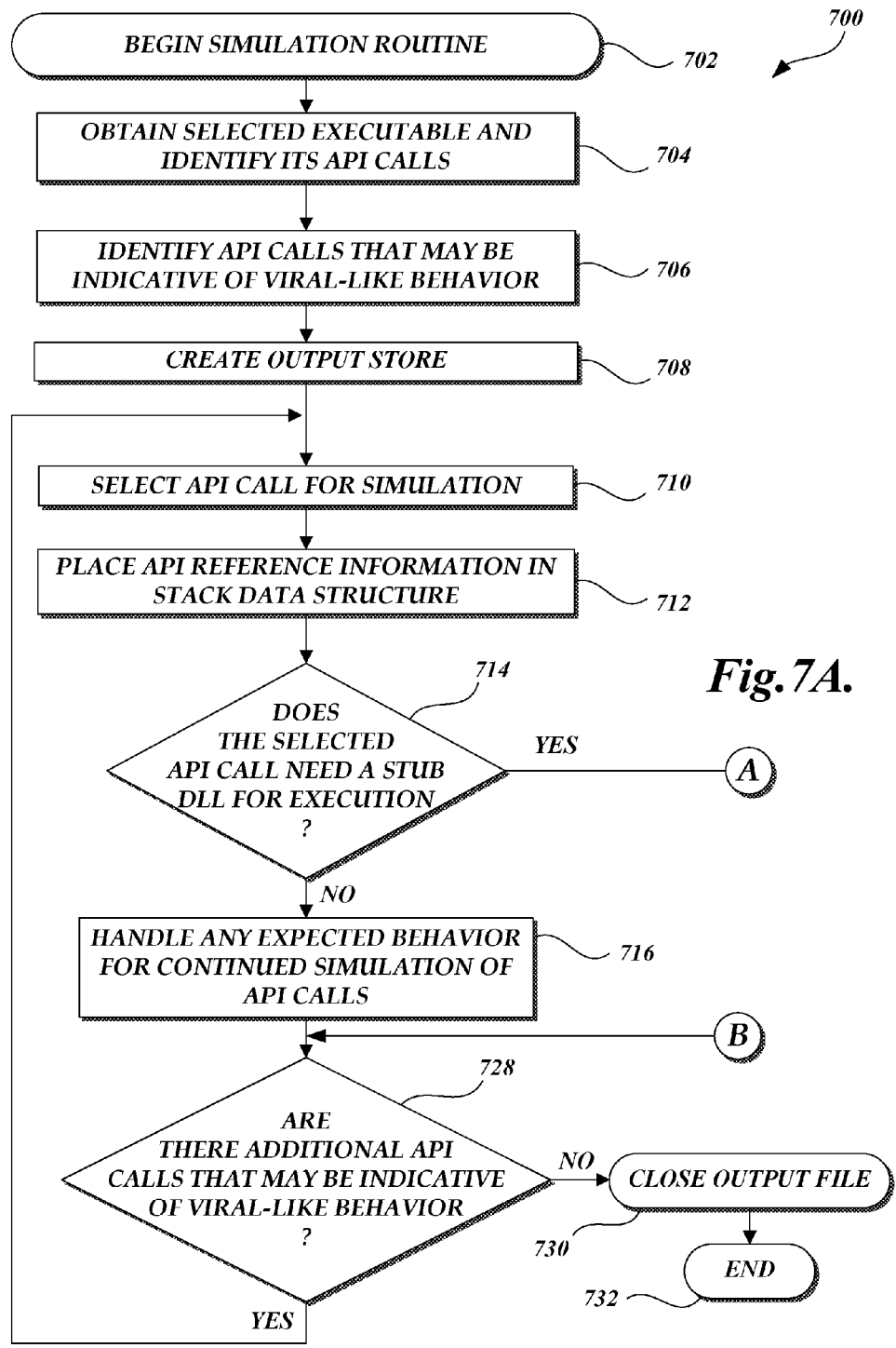
FIGS. 7A-B are flow diagrams illustrating the process of simulating the execution of potential malware in a virtual operating environment in accordance with the present invention.

FIG. 7A is a flow diagram illustrative of a simulation routine 700 suitable for implementation by the computing device 100. At block 702, the simulation routine begins. As described above, the virtual operating environment 106 consists of software-generated components that simulate a specific operating system, such as the Win 32 operating system. The software-generated components include an interface that allows the virtual operating environment to be instantiated and receive and execute executables.

At block 704, the executable passed to the virtual operating environment 106 is obtained and its API calls (including calling parameters) are identified and stored in a list. The APIs define parameters of data that are required from an executable when an API call is made. Since parameters passed to the APIs may be indicative of malware, API calls with their calling parameters are stored in the list.

At block 706, API calls that may be indicative of malware are identified. As described above, the present invention does not simulate all APIs supported by operating systems. The present invention identifies "interesting" API calls that may be indicative of malware. API handling routines 202 corresponding to the "interesting" API calls are included in the virtual operating environment 106. On the other hand, the virtual operating environment does not include API handling routines that do not correspond to "interesting" API calls. "Uninteresting" API calls are not simulated in the virtual operating environment 106. APIs that are "interesting" are determined by comparing a list of API handling routines 202 with the list of API calls identified at block 704. Those skilled in the art and others will recognize that identifying API calls indicative of malware, i.e., "interesting" API calls, may be implemented using different methods and that the embodiment described herein should be construed as exemplary and not limiting.

At block 708, an output store is created to store a behavior signature for each API call executed in the virtual operating environment 106. During execution, the behavior signatures are stored by the related stub DLL. When simulation is complete, the output store is available for analysis by the antivirus software that instantiated the virtual operating environment 106.

At block 710, an API call that is "interesting" is selected for execution in the virtual operating environment 106. Since dependencies between API calls frequently exist, selection of API calls happens in the same order as they occur in the selected executable.

At block 712, the selected API call is placed in a stack data structure, which serves as an area of storage in the virtual operating environment 106. Those skilled in the art and others will recognize that an API call and its calling parameters may be stored in any one of many data structures known in the art and that the use of a stack data structure should be construed as exemplary and not limiting.

At decision block 714, a test is conducted to determine whether the selected API call requires a stub DLL for execution. As described above, dependencies exist between API calls that require simulation of expected behavior. For example, some APIs support operations on files (i.e., conducting I/O with a storage media). Creating a file and conducting I/O with the same file requires a series of API calls, an example being: (1) a first API call to create the file and receive a file identifier; (2) a second API call to write to the file by using the file identifier; (3) a third API call to read previously written data from the file using the file identifier; and (4) a fourth API call to write the data to the master boot record of the operating system using the file identifier of the master boot record. Obviously, the effects of the second, third, and fourth API calls are not capable of being executed without a legitimate file identifier being returned from the first API call. Also, the effects of the fourth API call are dependent on the data being written and read by the second and third API calls. In this example, the data written to the master boot record in the fourth API call is not known unless all I/O with the newly created file is accurately simulated. The API handling routines 202 of the virtual operating environment 106 determine whether the selected API call requires a stub DLL for simulated execution. Typically, stub DLLs are necessary when an API call will generate dependencies or require the input/output emulator 204 for storage of data.

If the selected API call does not require a stub DLL, at block 716 an API handling routine performs any expected behavior so that subsequent API calls can be executed. For example, audio may be played on a computing device 100 using APIs. Typically, an API call that generates audio expects a non-zero return value that indicates the API call was successful. On the other hand, the return of a zero value indicates that an error occurred and stops execution. A stub DLL is not necessary for APIs calls that play audio because subsequent API calls will not depend on this behavior. However, continued simulation of the potential malware does depend on a non-zero value being returned to the calling executable. Therefore, an API handling routine returns a non-zero value to the calling executable, which allows additional API calls to execute. Then the routine proceeds to decision block 728, which is described below.

If an API call requires a stub DLL for simulation, at block 718 (FIG. 7B), the stack data structure 206 is queried for the reference information of the selected API. The reference information obtained from the stack data structure 206 permits identification of the correct stub DLL to load into the virtual address space 210.

Figure 7B:
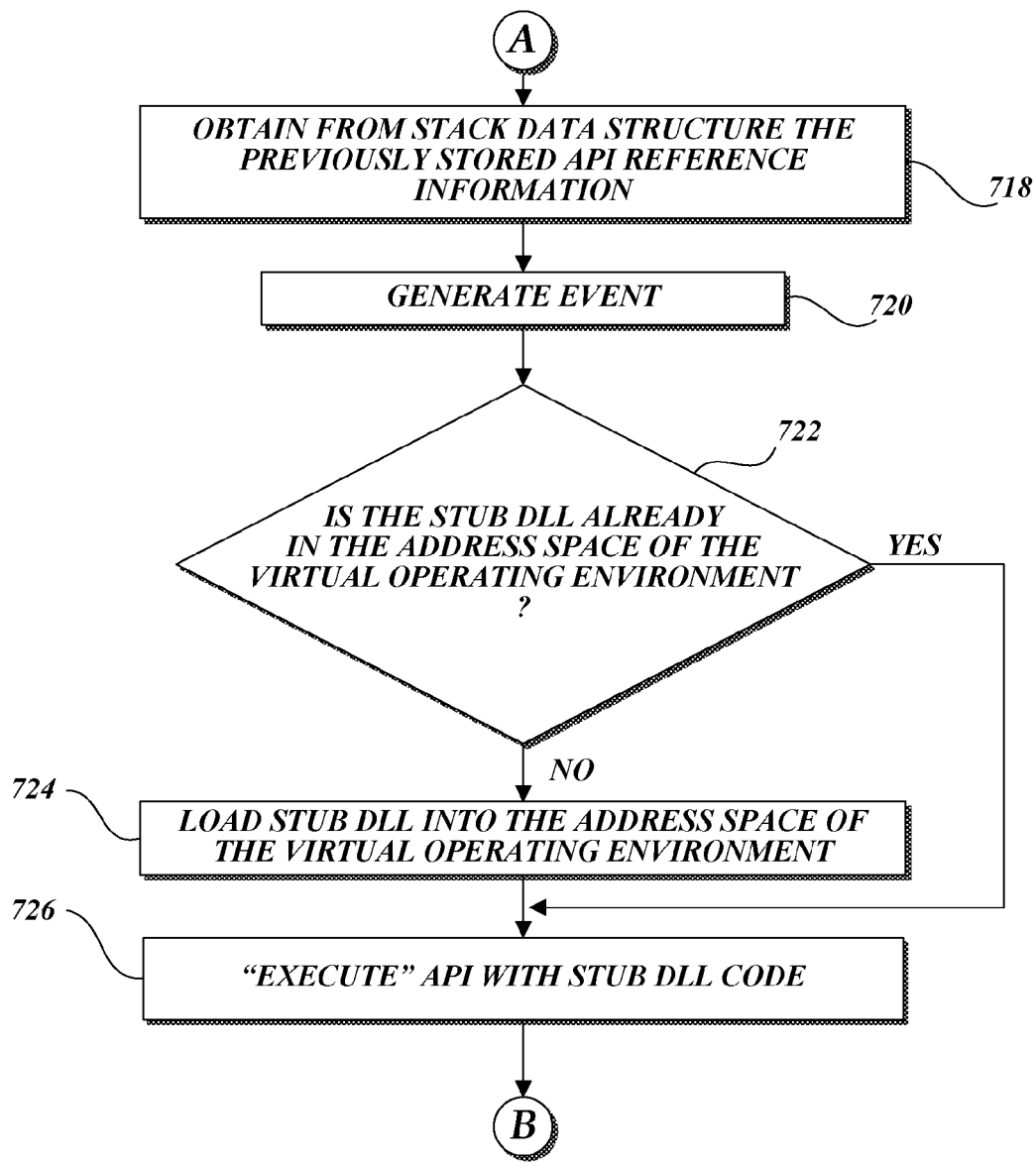

As illustrated in FIG. 7B, at block 720 an event is generated initiating the process of loading a stub DLL into the virtual address space 210. In some operating systems, such as the Win 32 operating systems, interactions between executables and computer hardware are coordinated by the operating system. For example, when an executable issues an API call requiring input, an event is generated and control of the hardware platform is transferred to the operating system. The operating system obtains data from the hardware platform and makes it available to the calling executable. FIGS. 3 and 4 and the accompanying text describe one example of when an operating system coordinates I/O after an event is generated with the loading of DLLs from a storage media 314 (i.e., input) into an executable's address space 318. Similarly the present invention generates an event when a stub DLL needs to be loaded to a location in memory available to the virtual operating environment 106, i.e., the virtual address space 210. FIGS. 5 and 6 and the accompanying text describe the process of loading a stub DLL from a storage media 314 into the virtual address space 210 after an event is generated.

At decision block 722 depicted in FIG. 7B, a test is conducted to determine whether the stub DLL that will simulate the selected API call is already loaded in the virtual address space 210. Since the virtual operating environment 106 simulates a sequence of API calls, the correct stub DLL may already be loaded into virtual address space 210. Stub DLLs that are already loaded in the virtual address space 210 are not loaded again.

If the stub DLL is already loaded in the virtual address space, the routine proceeds to block 726. If the stub DLL is not already loaded in the virtual address space 210 the routine proceeds to block 724 where the stub DLL is loaded into the virtual address space 210. FIGS. 5 and 6 and the accompanying text describe the process of loading stub DLLs from storage media 314 into the virtual address space 210.

At block 726, the selected API call is "executed" using the stub DLL previously loaded into the virtual address space 210. "Execution" of an API call using a stub DLL involves methods known in the art of generating machine instructions that are handled by a virtual processing unit 201. The virtual processing unit 201 accepts machine instruction and simulates the API call using the components of the virtual operating environment 106.

During "execution" at block 726, the stub DLL generates a behavior signature for the API call that is written to the output store created at block 708. Each behavior signature includes three elements: a behavior token; a first parameter value; and a second parameter value. It should be understood that the described behavior signatures are for illustration purposes only, and should be construed as exemplary and not limiting. The actual nature and organization of a behavior signature may vary substantially from the three elements described herein.

The behavior token is used to identify the particular behavior represented by the selected API call. The parameter values may include almost any type of value. For example, a parameter value may be a numeric value or may be a string that is passed to an API call. Alternatively, a parameter value may not be necessary or desirable. In such cases, a parameter value of "null" may be included to indicate that there is no parameter present.

Returning to FIG. 7A, at decision block 728, a test is conducted to determine whether there are additional API calls that are potentially indicative of malware. As described above, API calls identified for execution are stored in a list. Contents of the list are sequentially traversed until all API calls have been executed in the virtual operating environment 106. If all API calls have been executed, at block 730 the output store is closed and at block 732 the routine terminates. If some API calls have not been executed, the routine cycles back to block 710, and blocks 710 through 728 are repeated until all required API calls have been executed.

Figure 8:
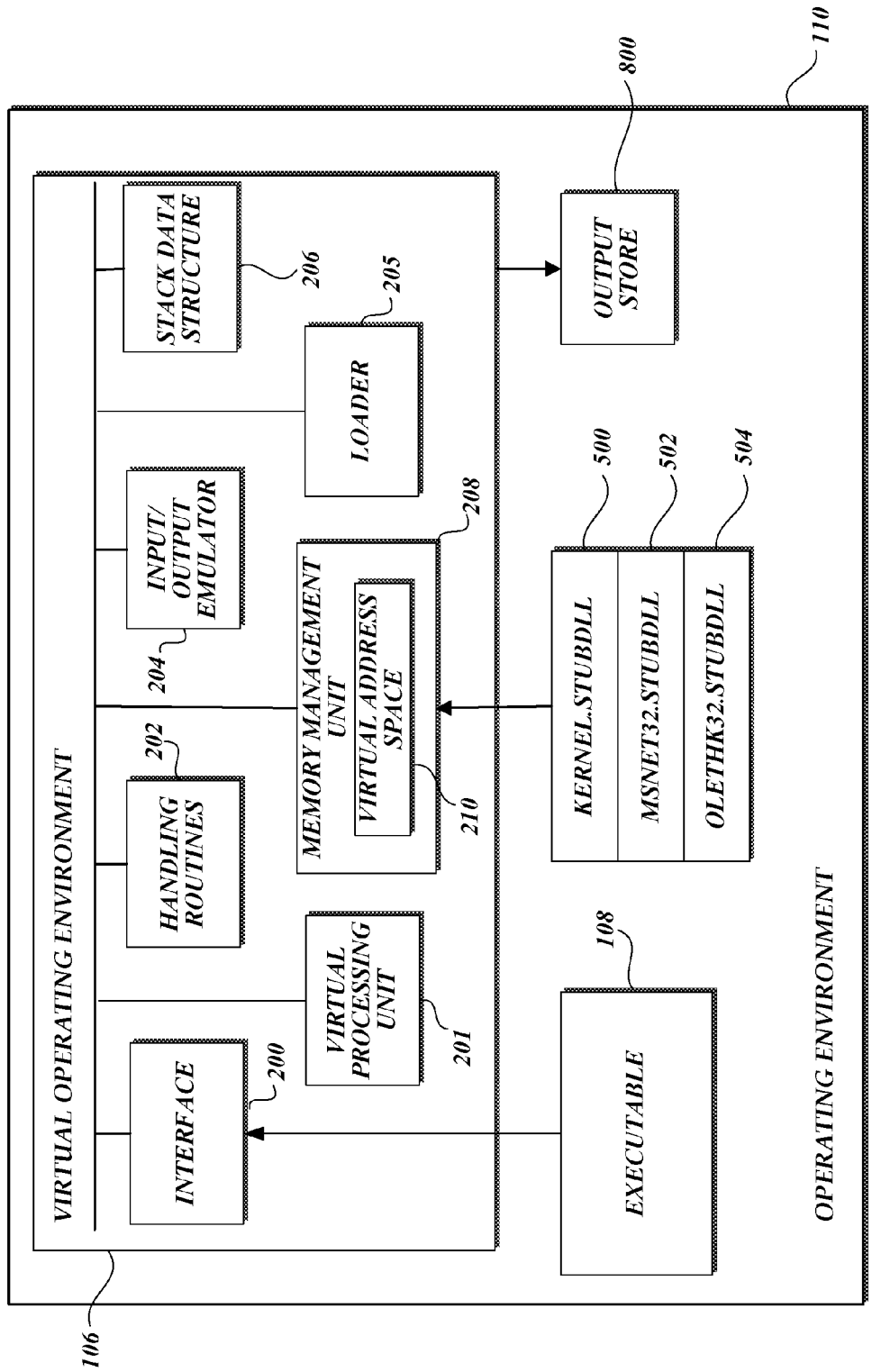
FIG. 8 is a block diagram of the components, inputs, and outputs of the virtual operating environment of the present invention.

As illustrated in FIGS. 2 and 8, the virtual operating environment 106 of the present invention includes an interface 200, virtual processing unit 201, API handling routines 202, an input/output emulator 204, a loader 205, a stack data structure 206, and a memory management unit 208 that manages a virtual address space 210. With reference to FIG. 8, the virtual operating environment 106 also obtains input and produces output when simulating an operating system in accordance with the present invention. As described above, input into the virtual operating environment 106 is an executable 108 representative of potential malware. Also, to facilitate simulation, a set of stub DLLs like KERNEL.STUBDLL 500, MSNET32.STUBDLL 502, and OLETHK32.STUBDLL 504 of FIG. 5 are obtained and loaded into the virtual address space 210. During simulation, an output store 800 is generated that contains an entry for each API call in executable 108 that was executed.

The interface 200 of the virtual operating environment 106 allows virus scanning software to instantiate the virtual operating environment 106 and pass executables such as executable 108 to the virtual operating environment for execution. When executable 108 is passed to the interface 200, the executable's API calls are parsed and stored in a list. As described below, the interface 200 identifies API calls in the executable 108 that are "interesting," i.e., identifies API calls that may be indicative of malware. As described above with reference to FIG. 7A (block 706), identification of API calls that are "interesting" is implemented by comparing the list of API calls identified in executable 108 with the list of API handling routines 202.

The virtual processing unit 201 accepts machine instructions and simulates API calls using components of the virtual operating environment 106. Since a virtual processing unit that accepts machine instructions is generally known in the art, further description of the virtual processing unit 201 is not provided herein.

The API handling routines 202 determine how the execution of each API call will be simulated in virtual operating environment 106. One method of simulation uses a stub DLL to "execute" an API call. If a stub DLL is required, an API handling routine stores the reference information of an API call on the stack data structure 206 and issues an event. As described above with reference to FIG. 7A, (block 720) an event transfers control of the hardware platform to the host operating system 104 so the corresponding stub DLL may be loaded into the virtual address space 210. Then, the reference information of the API call is obtained from the stack data structure and the corresponding stub DLL is loaded into the virtual address space 210. FIGS. 5 and 6 and the accompanying text describe the process of loading stub DLLs into the virtual address space 210 after an event is generated. In another method of simulation where a stub DLL is not required, the API handling routine performs any expected behavior necessary for execution to continue, i.e., returns a non-zero value to an audio based API call.

The input/output emulator 204 is responsible for simulating components of computing device 100 that perform I/O. Executable 108 may issue API calls that write data to an output device or expect data from an input device. As described with reference to FIG. 7A, at block 714 dependencies exist between API calls that require simulation of expected behavior. With the input/output emulator 204, API calls that generate I/O have a designated location in memory where data may be stored and recalled.

The memory management unit 208 handles the memory requirements of the virtual operating environment 106. All data used in the virtual operating environment 106, including stub DLLs, and executables are stored in memory. The memory management unit 208 maps data from memory to the virtual address space 210. During simulation, references to the virtual address space 210 are translated by the memory management unit 208 using methods known in the art.

While the presently preferred embodiment of the invention has been illustrated and described, it will be readily appreciated by those skilled in the art and others that, within the scope of the appended claims, various changes can be made therein without departing from the spirit and scope of the invention.

The embodiment of the invention in which an exclusive property or privilege is claimed are defined as follows:

1. A software system for executing an executable program on the hardware of a computer to determine the results of such execution without the program being executed in the normal manner by an operating system, the software system comprising:

a manager for obtaining an executable and directing calls that are potentially indicative of malware to an simulator;

a loader for making stubs related to said calls that are potentially indicative of malware available to the simulator;

a simulator for executing calls received from said manager, said execution completed using stubs obtained from said loader; and storage for storing the results of said simulator or executing calls received from said manager.

2. The software system according to claim 1, wherein said simulator receives and recalls data during the execution of calls received from said manager.

3. The software system according to claim 1, further comprising a comparator for comparing calls contained in said executable with calls that are indicative of malware.

4. The software system according to claim 1, wherein said storage is included in a host hardware platform and wherein said loader is included in a host operating system.

5. A software system for simulating an operating system of a computer comprising:
  (a) an interface operative to accept an executable and identify calls that are potentially indicative of malware;
  (b) a set of abbreviated application program interface handlers that mirror a set of fully-implemented application program interface handlers;
  (c) an input/output emulator operative to simulate computer devices that accept input or generate output;
  (d) a virtual address space for the storage of stubs, the stubs linked to calls made by the executable; and
  (e) a memory management unit for mapping locations in memory to a virtual address space.

6. The software system according to claim 5, wherein said calls are application programming interface ("API") calls and further comprising: a stack data structure operative to store and recall API calls.

7. The software system according to claim 5, further comprising an output store for storing behavior signatures generated by said stubs.

8. A computer-implementable method for determining the behavior of an executable comprising:
  (a) selecting evaluation calls made by the executable to the interface of an operating system;
  (b) loading stubs into a virtual address space, the stubs:
    (i) mirroring the calls made to the interface of an operating system; and
    (ii) determining a behavior signature for the selected calls;
  (c) executing the selected calls inside of a virtual operating environment using the loaded stubs dynamically linked libraries; and
  (d) determining the behavior signatures resulting from said execution of the selected calls inside of a virtual operating environment.

9. The method of claim 8 wherein the calls selected for evaluation are a subset of calls made by the executable to the interface of an operating system.

10. The method of claim 8 wherein the calls are application programming interface (API) calls.

11. The method as recited in claim 8 further comprising writing the behavior signature of the selected calls to an output store.

12. The method as recited in claim 11 wherein writing the behavior signature to an output media includes writing three parameters to the output media comprising:
  (a) a first parameter indicative of the call made to the operating system;
  (b) a second parameter operative to store a variable of known data types; and
  (c) a third parameter operative to store a variable of known data types.

13. The method as recited in claim 9, wherein selecting a subset of calls includes:
  (a) traversing the executable's machine code and identifying calls that are directed to the interface of the operating system; and
  (b) identifying calls that are potentially indicative of malware.

14. The method as recited in claim 13, wherein identifying calls that are potentially indicative of malware includes:
  comparing calls made in the executable with calls that exist in known malware; and
  if a call matches one that exists in known malware, determining that the call is potentially indicative of malware.

15. The method as recited in claim 13, wherein identifying calls that are potentially indicative of malware includes:
  comparing calls made in the executable with calls that are identified as a future security threat from malware; and
  if a call matches one that is identified as a future security threat from malware, determining that the call is potentially indicative of malware.

16. The method as recited in claim 9, wherein selecting a subset of calls includes determining if each call requires execution by a stub.

17. The method as recited in claim 8, wherein loading stubs is initiated by an event generated by the virtual operating environment.

18. The method as recited in claim 8, wherein loading stubs is performed by a loader that copies the stubs from a storage media to a virtual address space.

19. The method as recited in claim 8, wherein loading stubs includes determining the stubs that handle the selected calls.

* * * * *